US012628256B2

(12) United States Patent
Kim et al.

(10) Patent No.: US 12,628,256 B2
(45) Date of Patent: May 12, 2026

(54) LIGHTING APPARTUS AND METHOD OF CONTROLLING THE SAME

(71) Applicant: SAMSUNG ELECTRONICS CO., LTD., Suwon-si (KR)

(72) Inventors: Jieun Kim, Suwon-si (KR); Eunha Choi, Suwon-si (KR); Joayoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 291 days.

(21) Appl. No.: 18/225,392

(22) Filed: Jul. 24, 2023

(65) Prior Publication Data

US 2024/0138041 A1    Apr. 25, 2024
US 2024/0237175 A9    Jul. 11, 2024

Related U.S. Application Data

(63) Continuation of application No. PCT/KR2023/010076, filed on Jul. 14, 2023.

(30) Foreign Application Priority Data

Oct. 19, 2022    (KR) ........................ 10-2022-0135222

(51) Int. Cl.
*H05B 47/11*      (2020.01)
*G06T 7/90*      (2017.01)
            (Continued)

(52) U.S. Cl.
CPC ................ *H05B 47/11* (2020.01); *G06T 7/90* (2017.01); *H04N 5/66* (2013.01); *H05B 45/10* (2020.01); *H05B 45/20* (2020.01)

(58) Field of Classification Search
CPC ........ H05B 47/11; H05B 45/10; H05B 45/20; G06T 7/90; H04N 21/4131; H04N 5/66
See application file for complete search history.

(56) References Cited

U.S. PATENT DOCUMENTS 5,826,102 A * 10/1998 Escobar ................. G11B 27/34
                                           715/202
6,611,297 B1    8/2003 Akashi et al.
(Continued)

FOREIGN PATENT DOCUMENTS

JP      2008-277092      11/2008
JP         4176233      11/2008
(Continued)

OTHER PUBLICATIONS

International Search Report, PCT/ISA/210, dated Oct. 26, 2023, in PCT Application No. PCT/KR2023/010076.
(Continued)

*Primary Examiner* — Michael B. Pierorazio
(74) *Attorney, Agent, or Firm* — STAAS & HALSEY LLP

(57) ABSTRACT

A lighting apparatus including a lighting module configured to emit light; and at least one processor configured to determine a color and a brightness of a current scene of content displayed on a display apparatus, and to control the lighting module to emit, in a space in which the display apparatus is located, light with a color and brightness corresponding to the determined color and brightness of the current scene of the content.

11 Claims, 18 Drawing Sheets

(51) Int. Cl.

| | |
|---|---|
| *H04N 5/66* | (2006.01) |
| *H05B 45/10* | (2020.01) |
| *H05B 45/20* | (2020.01) |

(56) References Cited

U.S. PATENT DOCUMENTS

| | | | | | |
|---|---|---|---|---|---|
| 6,888,457 | B2 * | 5/2005 | Wilkinson | ............ | G06F 1/1626 |
| | | | | | 455/100 |
| 8,893,164 | B1 * | 11/2014 | Teller | ................ | G06Q 30/0252 |
| | | | | | 725/12 |
| 8,893,185 | B2 * | 11/2014 | Wasilewski | ............ | H04L 63/08 |
| | | | | | 726/28 |
| 9,332,620 | B2 | 5/2016 | Shin | | |
| 9,955,557 | B2 | 4/2018 | Shin | | |
| 2002/0085843 | A1 * | 7/2002 | Mann | ...................... | E03C 1/057 |
| | | | | | 396/374 |
| 2002/0169012 | A1 * | 11/2002 | Eves | ................ | H04N 21/4131 |
| | | | | | 463/1 |
| 2002/0169817 | A1 * | 11/2002 | Eves | ................ | H04N 21/4131 |
| | | | | | 709/201 |
| 2003/0005454 | A1 * | 1/2003 | Rodriguez | ........ | H04N 21/2385 |
| | | | | | 348/E7.071 |
| 2003/0033600 | A1 * | 2/2003 | Cliff | ...................... | A61B 5/162 |
| | | | | | 725/12 |
| 2005/0097618 | A1 * | 5/2005 | Arling | ............... | H04N 21/6125 |
| | | | | | 725/100 |
| 2006/0192855 | A1 * | 8/2006 | Harris | ............... | H04N 21/4131 |
| | | | | | 348/162 |
| 2006/0194632 | A1 * | 8/2006 | Hendrickson | ........... | A63F 13/30 |
| | | | | | 463/42 |
| 2006/0256133 | A1 * | 11/2006 | Rosenberg | .............. | G06F 3/013 |
| | | | | | 345/619 |
| 2007/0126864 | A1 * | 6/2007 | Bhat | ............... | H04N 21/42202 |
| | | | | | 348/51 |
| 2007/0126932 | A1 * | 6/2007 | Bhat | ................. | H04N 21/4122 |
| | | | | | 348/739 |
| 2007/0126938 | A1 * | 6/2007 | Tan | ........................ | H04N 21/47 |
| | | | | | 434/428 |
| 2007/0136769 | A1 * | 6/2007 | Goldberg | ............ | G10H 1/0025 |
| | | | | | 725/78 |
| 2007/0157247 | A1 * | 7/2007 | Cordray | ................. | G06Q 30/02 |
| | | | | | 348/E5.006 |
| 2007/0257928 | A1 * | 11/2007 | Marks | ..................... | G09G 5/00 |
| | | | | | 345/581 |
| 2009/0133051 | A1 * | 5/2009 | Hildreth | ........... | H04N 21/42204 |
| | | | | | 725/28 |
| 2009/0138805 | A1 * | 5/2009 | Hildreth | ............ | H04N 21/4755 |
| | | | | | 715/745 |
| 2010/0058400 | A1 * | 3/2010 | Nicas | ................. | H04N 7/17318 |
| | | | | | 725/74 |
| 2010/0096491 | A1 * | 4/2010 | Whitelaw | ................ | B64G 1/00 |
| | | | | | 725/75 |
| 2010/0118193 | A1 * | 5/2010 | Boyden | .................. | G09G 5/006 |
| | | | | | 348/554 |
| 2010/0141578 | A1 * | 6/2010 | Horiuchi | .......... | H04N 21/42204 |
| | | | | | 345/158 |
| 2011/0018462 | A1 * | 1/2011 | Lowe | ................. | H04N 21/4131 |
| | | | | | 362/249.02 |
| 2011/0058105 | A1 * | 3/2011 | Nagashima | ........ | H04N 21/4318 |
| | | | | | 348/602 |
| 2011/0075036 | A1 | 3/2011 | Galeazzi et al. | | |
| 2011/0138416 | A1 * | 6/2011 | Kang | .................. | H04N 21/4821 |
| | | | | | 725/39 |
| 2011/0190911 | A1 | 8/2011 | Iwanami et al. | | |
| 2012/0075168 | A1 * | 3/2012 | Osterhout | ............... | G06F 3/017 |
| | | | | | 345/8 |
| 2012/0098960 | A1 | 4/2012 | Fujino et al. | | |
| 2012/0117103 | A1 * | 5/2012 | Farrelly | .................. | H04L 67/10 |
| | | | | | 707/769 |
| 2012/0192234 | A1 * | 7/2012 | Britt | ................... | H04N 21/4882 |
| | | | | | 725/98 |
| 2012/0324550 | A1 * | 12/2012 | Wasilewski | ........ | H04N 21/4661 |
| | | | | | 726/5 |
| 2013/0014136 | A1 * | 1/2013 | Bhatia | .............. | H04N 21/44218 |
| | | | | | 725/9 |
| 2013/0059601 | A1 * | 3/2013 | Tran | ................. | H04N 21/41407 |
| | | | | | 455/456.1 |
| 2014/0359647 | A1 * | 12/2014 | Shoemake | ......... | H04N 21/6582 |
| | | | | | 725/10 |
| 2015/0026708 | A1 * | 1/2015 | Ahmed | ................ | H04N 21/812 |
| | | | | | 725/12 |
| 2015/0106851 | A1 * | 4/2015 | Pauli | ..................... | G06F 3/0386 |
| | | | | | 725/52 |
| 2015/0309687 | A1 * | 10/2015 | Herigstad | ............ | H04N 21/478 |
| | | | | | 715/784 |
| 2015/0373408 | A1 * | 12/2015 | Yurasits | ................ | H04H 60/45 |
| | | | | | 725/12 |
| 2016/0127786 | A1 * | 5/2016 | Langer | ............... | H04N 21/4542 |
| | | | | | 725/28 |
| 2016/0323643 | A1 * | 11/2016 | Panchaksharaiah | ......................... | |
| | | | | | H04N 21/4753 |
| 2018/0035166 | A1 * | 2/2018 | Truong | .............. | H04N 21/4147 |
| 2018/0152761 | A1 * | 5/2018 | Truong | .............. | H04N 21/4524 |
| 2022/0408138 | A1 * | 12/2022 | Wu | .................. | H04N 21/44227 |

FOREIGN PATENT DOCUMENTS

| | | |
|---|---|---|
| JP | 2009-129754 | 6/2009 |
| JP | 5045756 | 10/2012 |
| KR | 10-2004-0093757 | 11/2004 |
| KR | 10-2006-0093234 | 8/2006 |
| KR | 10-0963773 | 6/2010 |
| KR | 10-2011-0022658 | 3/2011 |
| KR | 10-2011-0030656 | 3/2011 |
| KR | 10-2011-0061729 | 6/2011 |
| KR | 10-2011-0076297 | 7/2011 |
| KR | 10-2013-0041690 | 4/2013 |
| KR | 10-2014-0122908 | 10/2014 |
| KR | 10-1795099 | 11/2017 |
| KR | 10-2021-0009609 | 1/2021 |
| KR | 10-2021-0016672 | 2/2021 |
| KR | 10-2022-0140163 | 10/2022 |

OTHER PUBLICATIONS

Written Opinion, PCT/ISA/237, dated Oct. 26, 2023, in PCT Application No. PCT/KR2023/010076.

Office Action dated Feb. 26, 2026, issued Korean Application No. 10-2022-0135222.

\* cited by examiner

FIG. 5

(COLOR: SKY BLUE
/
BRIGHTNESS: HIGH)

(COLOR: RED
/
BRIGHTNESS: MEDIUM)

1

S                    O

LIGHTING APPARTUS AND METHOD OF CONTROLLING THE SAME

CROSS-REFERENCE TO RELATED APPLICATION

This application is based on and claims priority under 35 U.S.C. § 119 to Korean Patent Application No. 10-2022-0135222, filed on Oct. 19, 2022, in the Korean Intellectual Property Office, the disclosures of which are incorporated herein by reference.

BACKGROUND

1. Field

The present disclosure relates to a lighting apparatus that emits light into an indoor space.

2. Description of the Related Art

In general, a lighting apparatus refers to an apparatus provided in an indoor space and capable of emitting light into the indoor space, and the indoor space may have different atmospheres depending on the light emitted from the lighting apparatus.

The lighting apparatus may include a light emitting device, such as a light emitting diode (LED), and the light emitting device may emit light according to a user's input.

Although the lighting apparatus is a passive device operating based on a user's input (e.g., ON/OFF of a switch) as described above, discussion has been actively conducted about a technology capable of automatically adjusting emitted light in response to environmental change of an indoor space.

SUMMARY

According to an embodiment, a lighting apparatus may include a lighting module configured to emit light; and at least one processor configured to determine a color and a brightness of a current scene of content displayed on a display apparatus, and to control the lighting module to emit, in a space in which the display apparatus is located, light with a color and brightness corresponding to the determined color and brightness of the current scene of the content.

According to an embodiment, the lighting apparatus may further include a communicator configured to communicate with the display apparatus, wherein the at least one processor is configured to determine the color and the brightness of the current scene of the content based on information received from the display apparatus through the communicator.

According to an embodiment, the lighting apparatus may further include a communicator configured to communicate with the display apparatus, wherein the at least one processor is configured to, in response to image data of the content received from the display apparatus through the communicator, determine the color and the brightness of the current scene of the content based on image processing of the received image data.

According to an embodiment, the at least one processor may be configured to determine a color and a brightness of an upper region among regions excluding a focused object in the current scene of the content as the color and the brightness of the current scene of the content.

According to an embodiment, the at least one processor may be configured to determine a color and a brightness of a region occupying a largest area in the current scene of the content as the color and the brightness of the current scene of the content.

According to an embodiment, the lighting module may include a plurality of light emitting devices arranged in two dimensions, and the at least one processor may be configured to identify a light source in the current scene of the content, and, in response to the light source being identified in the current scene of the content, control the lighting module so that at least one light emitting devices of the plurality of light emitting devices in a direction corresponding to the light source within the lighting module emits white light.

According to an embodiment, the lighting apparatus may further include a communicator configured to communicate with the display apparatus, wherein the at least one processor may be configured to, in response to index information of the current scene of the content received from the display apparatus through the communicator, determine the color and the brightness of the current scene of the content based on the received index information of the current scene of the content.

According to an embodiment, the lighting apparatus may further includes a camera on one side of the lighting module, wherein the at least one processor may be configured to determine the color and brightness of the current scene of the content through image processing of a screen of the display apparatus photographed by the camera.

According to an embodiment, the at least one processor may be configured to update the color and the brightness of light emitted by the lighting module based on a scene of the content being switched.

According to an embodiment, the at least one processor may be configured to, in response to an object moving in the current scene of the content, control the lighting module so that a gradation of a color corresponding to the current scene of the content moves in a direction corresponding to movement of the object.

According to an embodiment, the at least one processor may be configured to control the lighting module to emit light with a gradation of a color based on a direction in which the display apparatus is located.

According to an embodiment, the lighting module may be provided as a plurality of lighting modules, and the at least one processor may be configured to control he plurality of lighting modules so that brightness of a respective lighting module is lower as distance of the respective lighting module from the display apparatus increases.

According to an embodiment, a method may include, by at least one processor, determining a color and a brightness of a current scene of content displayed on a display apparatus, and controlling a lighting module to emit, in a space in which the display apparatus is located, light with a color and a brightness corresponding to the determined color and brightness of the current scene of the content.

According to an embodiment, the determining the color and brightness of the current scene of the content may include determining the color and the brightness of the current scene of the content based on information received from the display apparatus.

According to an embodiment, the determining of the color and the brightness of the current scene of the content may include, in response to image data of the content received from the display apparatus, determining the color and the brightness of the current scene of the content based on image processing of the received image data.

According to an embodiment, the determining of the color and the brightness of the current scene of the content may include determining a color and a brightness of an upper region among regions excluding a focused object in the current scene of the content as the color and the brightness of the current scene of the content.

According to an embodiment, the determining of the color and the brightness of the current scene of the content may include determining a color and a brightness of a region occupying a largest area in the current scene of the content as the color and the brightness of the current scene of the content.

According to an embodiment, the lighting module may include a plurality of light emitting devices arranged in two dimensions, and the method may further include, by the at least one processor, identifying a light source in the current scene of the content, and, in response to the light source being identified in the current scene of the content, controlling the lighting module so that at least one light emitting device of the plurality of light emitting devices in a direction corresponding to the light source within the lighting module emits white light.

According to an embodiment, the determining of the color and the brightness of the current scene of the content may include, in response to index information of the current scene of the content received from the display apparatus, determining the color and the brightness of the current scene of the content based on the received index information of the current scene of the content.

According to an embodiment, the method may further include updating the color and the brightness of light emitted by the lighting module based on a scene of the content being switched.

According to an embodiment, a lighting apparatus may include a lighting module configured to emit light; and at least one processor configured to identify content played on a display apparatus, and to control the lighting module to emit, in a space in which the display apparatus is located, light with a color and brightness corresponding to the identified content.

BRIEF DESCRIPTION OF THE DRAWINGS

Aspects, features, advantages, and objects of the disclosure will become apparent and more readily appreciated from the following description of the embodiments, taken in conjunction with the accompanying drawings of which:

FIG. 5 is a control block diagram of a lighting apparatus according to an embodiment;

DETAILED DESCRIPTION

Figure 1:
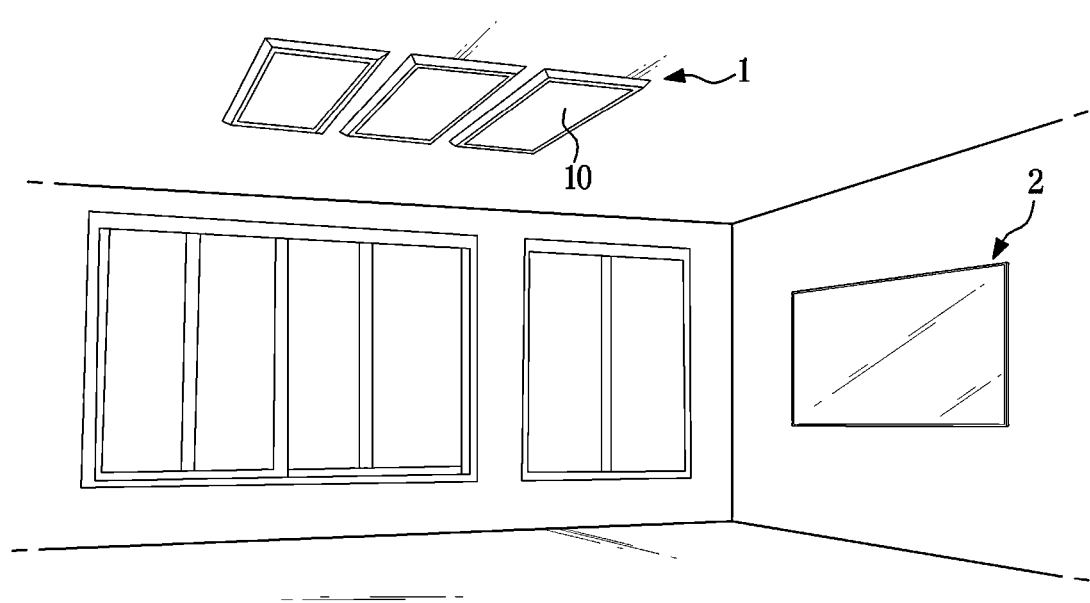
FIG. 1 is a view for describing an installation example of a lighting apparatus according to an embodiment.

The embodiments described in the present specification and the configurations shown in the drawings are only examples of preferred embodiments of the present disclosure, and various modifications may be made at the time of filing of the present disclosure to replace the embodiments and drawings of the present specification.

It will be further understood that the term "connect" or its derivatives refer both to direct and indirect connection, and the indirect connection includes a connection over a wireless communication network.

In addition, the terms used herein are for the purpose of describing the embodiments and are not intended to restrict and/or to limit the present disclosure. For example, the singular expressions herein may include plural expressions, unless the context clearly dictates otherwise. In addition, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

In addition, it will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may in addition be referred to as a first component.

In addition, the terms, such as "~ part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Reference numerals used for method steps are just used for convenience of explanation, but not to limit an order of the steps. Thus, unless the context clearly dictates otherwise, the written order may be practiced otherwise.

Hereinafter embodiments according to the present disclosure will be described in detail with reference to the accompanying drawings.

FIG. 1 is a view for describing an installation example of a lighting apparatus according to an embodiment.

Referring to FIG. 1, a lighting apparatus (1) according to an embodiment may be provided on a ceiling of an indoor space and emit light into the indoor space.

For example, referring to FIG. 1, the lighting apparatus 1 may include at least one lighting module 10, and the lighting module 10 may include an array of light emitting devices as will be described below, and emit light into the indoor space. However, the number of lighting modules 10 included in the lighting apparatus 1 is not limited, and may be provided in various numbers according to embodiments.

The lighting apparatus 1 according to an embodiment is connected to a display apparatus 2 provided in the indoor space to emit light having a color and a brightness that may match those of content played on the display apparatus 2 into the indoor space. Details thereof are described in detail below.

Hereinafter, the structural characteristics of the lighting apparatus 1 will be schematically described first.

Figure 2:
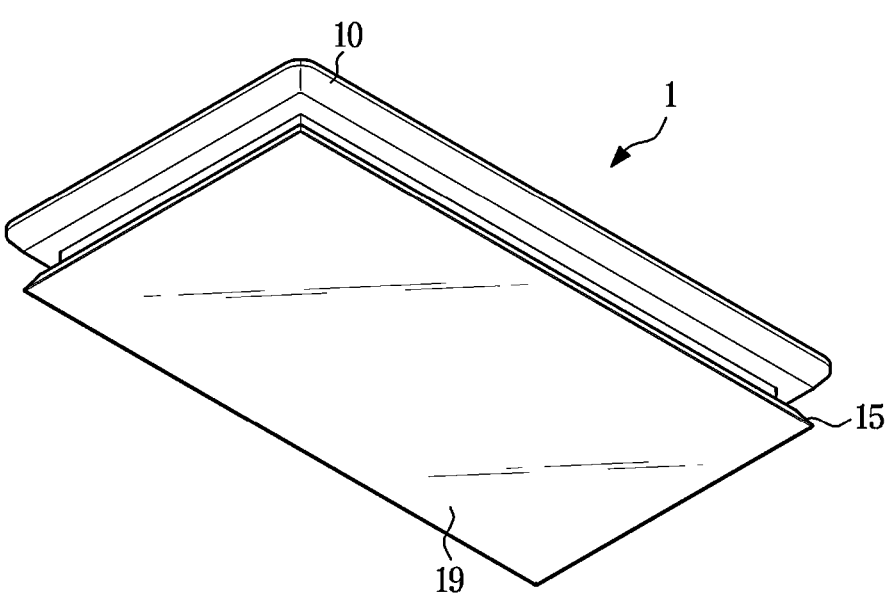
FIG. 2 is an external view of a lighting apparatus according to an embodiment.
Figure 3:
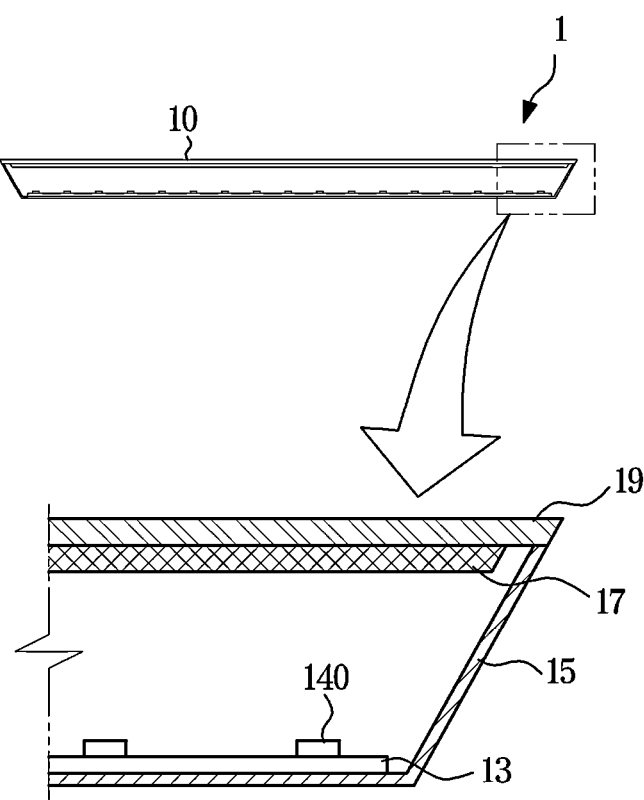
FIG. 3 is a cross-sectional side view of a lighting apparatus according to an embodiment.
Figure 4:
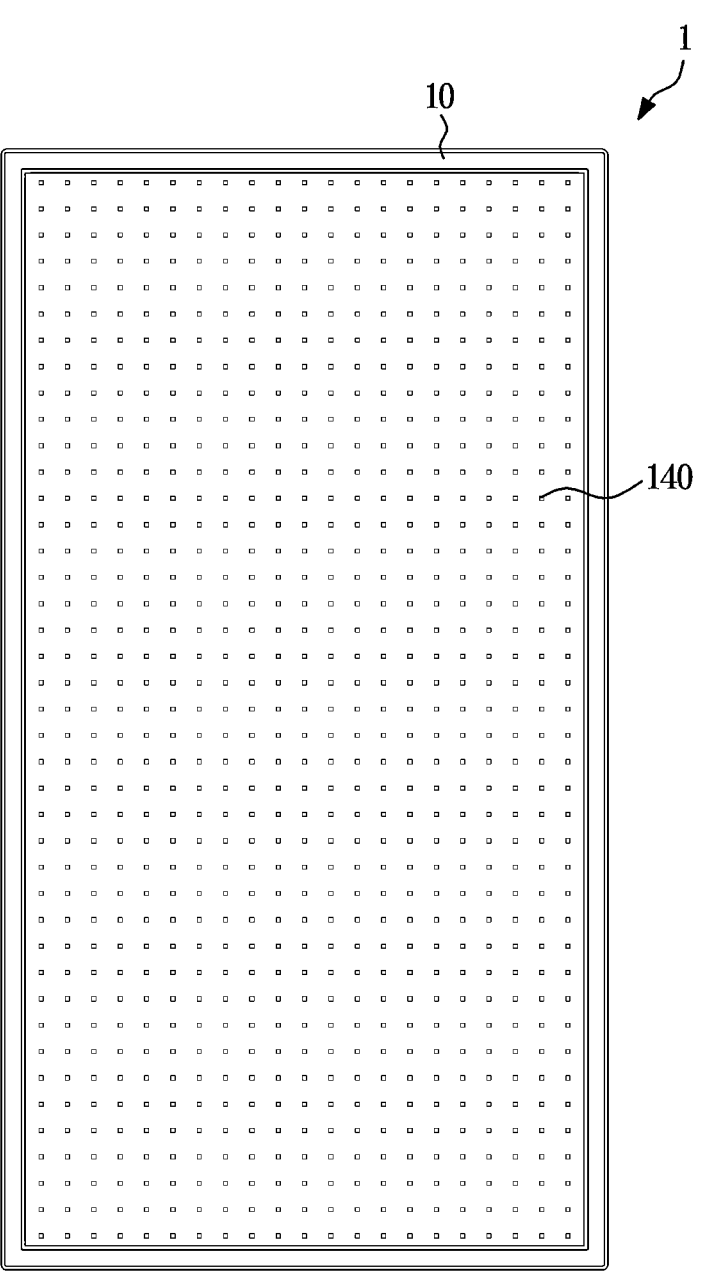
FIG. 4 is a view schematically illustrating an array of light emitting devices of a lighting apparatus according to an embodiment.

FIG. 2 is an external view of a lighting apparatus (1) according to an embodiment, FIG. 3 is a cross-sectional side view of a lighting apparatus (1) according to an embodiment, and FIG. 4 is a view schematically illustrating an array of light emitting devices of a lighting apparatus (1) according to an embodiment.

Referring to FIGS. 2 and 3, the lighting module 10 of the lighting apparatus 1 according to an embodiment may be provided on a ceiling and include a light emitting window 19 formed on a lower surface of a body 15 to emit light downward.

For example, the light emitting window 19 may be a flat plate formed of a transparent material or a polymethyl methacrylate (PMMA) material. However, the material of the light emitting window 19 is not limited as long as it is transparent.

In addition, the body 15 of the lighting module 10 may couple the ceiling to the lighting module 10, and may fix a printed circuit board 13 on which the light emitting device 140 is provided, a diffusion plate 17 diffusing light emitted from the light emitting device 140, and the light emitting window 19 emitting light to the indoor space.

Specifically, the printed circuit board 13 on which the array of light emitting devices 140 is provided may be provided inside the body 15, and the diffusion plate 17 and the light emitting window 19 may be provided on a front surface of the printed circuit board 13.

On an upper surface of the printed circuit board 13, as shown in FIG. 4, the light emitting devices 140 may be arranged in two dimensions, and may be supplied with a driving voltage and a driving current by a power wiring (not shown) and a driving device (not shown) provided on the printed circuit board 13.

For example, the light emitting device 140 may be provided as a light emitting diode (LED) or an organic light emitting diode (OLED). Light emitting diodes may be implemented in various sizes, and may include, for example, Mini LEDs and/or Micro LEDs.

Light emitted from the light emitting device 140 may be first incident onto the diffusion plate 17 and diffused, and then incident onto the light emitting window 19 to thereby be emitted to the indoor space.

In this case, the diffuser plate 17 may allow the light emitted from the plurality of light emitting devices 140 to be diffused inside the diffuser plate 17 such that unevenness in luminance due to the plurality of light emitting devices 140 may be eliminated. In other words, the diffuser plate 17 may allow non-uniform light of the plurality of light emitting devices 140 to be uniformly emitted to the entire surface.

In the above, the structural characteristics of the lighting apparatus 1 have been schematically described. The following description will be made in relation that the lighting apparatus 1 emits light with a color and a brightness matching that of the content of the display apparatus 2 in connection with the display apparatus 2.

Figure 5:
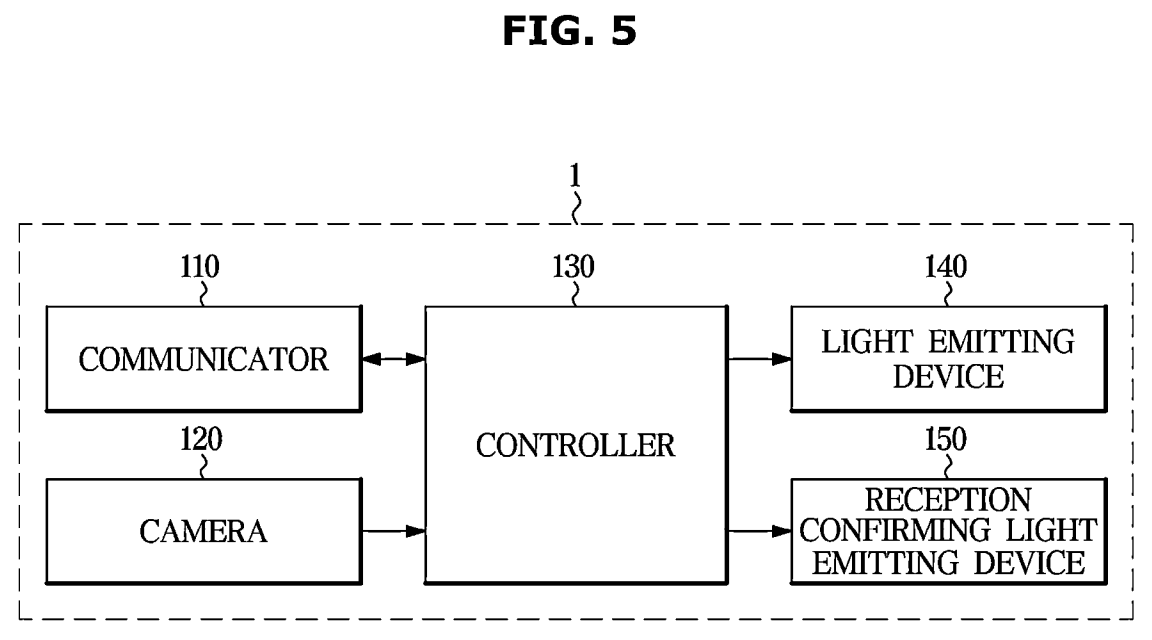

FIG. 5 is a control block diagram of a lighting apparatus (1) according to an embodiment.

Referring to FIG. 5, a lighting apparatus 1 according to an embodiment includes a communicator 110 communicating with a display apparatus 2 located in an indoor space in which the lighting apparatus 1 is provided, a camera 120 provided at one side of the lighting module 10 to photograph the display apparatus 2, a controller 130 configured to control the lighting module 10 to emit light with a color and a brightness corresponding to a color and a brightness of a scene of content played on the display apparatus 2, a plurality of light emitting devices 140 arranged in a two-dimensional array to constitute the lighting module 10, and a reception confirming light emitting device 150 emitting light for reception confirmation in response to information being received from the display apparatus 2.

However, the configuration of the lighting apparatus 1 shown in FIG. 5 is only an example, and depending on embodiments, some of the components included in FIG. 5 may be omitted, or components not included in FIG. 5 may be added as components of the lighting apparatus 1.

The communicator 110 according to an embodiment may communicate with the display apparatus 2 located in an indoor space in which the lighting apparatus 1 is provided. To this end, the communicator 110 may be provided with a known type of wireless communication module.

In addition, the communicator 110 may perform communication with an external server (not shown) in addition to the display apparatus 2 according to embodiments.

The camera 120 according to an embodiment may be provided at one side of the lighting module 10 and photograph the screen of the display apparatus 2. To this end, the camera 120 may be provided as a known type of image sensor.

The controller 130 according to an embodiment may identify content played on the display apparatus 2 based on communication with the display apparatus 2.

Specifically, the controller 130 may identify content played on the display apparatus 2 by receiving image data from the display apparatus 2 or receiving index information corresponding to an image from the display apparatus 2.

In addition, the controller 130 may identify content played on the display apparatus 2 based on image data of the display apparatus 2 photographed by the camera 120.

The controller 130 according to an embodiment may control the lighting module 10 to emit light with a color and a brightness corresponding to a color and a brightness of a current scene of content.

Specifically, the controller 130 may determine the color and the brightness of the current scene of content based on information received from the display apparatus 2. In this case, according to embodiments, the controller 130 may, in response to the information being received from the display apparatus 2, control the reception confirming light emitting device 150 provided on the body 15 of the lighting module 10 to emit light such that the user confirms the reception of the information.

According to embodiments, the controller 130 may, in response to image data of content being received from the display apparatus 2, determine the color and the brightness of the current scene of the content based on image processing of the image data.

For example, the controller 130 may determine a color and a brightness of an upper region among regions of the current scene of the content, which excludes a focused object, as the color and the brightness of the current scene of the content.

In addition, the controller 130 may determine a color and a brightness of a region occupying the largest area within the current scene of the content as the color and the brightness of the current scene of the content.

According to embodiments, the controller 130 may, in response to index information of the current scene of content being received from the display apparatus 2, determine the color and the brightness of the current scene of the content based on the index information.

The index information may correspond to index information for a corresponding scene, such as information about a time point such as dawn, daytime, or night, or information about a place such as a cafe, the sea, or a mountain.

According to embodiments, the controller 130 may determine the color and the brightness of the current scene of the content based on image processing of a screen of the display apparatus 2 photographed through the camera 120.

In this case, the color of the content played by the display apparatus 2 and the color of the light emitted from the lighting module 10 may be colors of the same color family, and the color of the content and the color of light emitted from the lighting module 10 corresponding thereto may be stored in advance to match each other.

In addition, the brightness of the content played by the display apparatus 2 may be proportional to the brightness of light emitted from the lighting module 10, and the brightness of the content and the brightness of light emitted from the lighting module 10 corresponding thereto may be stored in advance to match each other.

In this case, the controller 130 may update the color and the brightness of light to be emitted by the lighting module 10 whenever the content scene is switched.

The controller 130 according to an embodiment may control the lighting module 10 to emit light with a gradation of a color based on a direction in which the display apparatus 2 is located.

Specifically, the controller 130 may determine a color corresponding to a color of a scene of content played on the display apparatus 2, and control each of the light emitting devices 140 in the 2D-array of the light emitting devices 140 to emit light of a color having a higher brightness as being nearing to a side in which the display apparatus 2 is located.

The controller 130 according to an embodiment may, in response to the lighting modules 10 being provided in plural, control each of the plurality of lighting modules 10 to emit light of a color having a lower brightness as being distant from a side in which the display apparatus 2 is located.

Specifically, the controller 130 may determine a color corresponding to a color of a scene of content played on the display apparatus 2, and control each of the plurality of lighting modules 10 to emit light with a color of lower brightness as being distant from a side in which the display apparatus 2 is located.

The controller 130 according to an embodiment may, in response to a light source L (e.g., the sun or a lighting lamp) being identified in the current scene of the content being played on the display apparatus 2, control the lighting module 10 such that at least one light emitting device 140 in the lighting module 10 in a direction corresponding to the light source L emits white light.

In addition, the controller 130 according to an embodiment may, in response to movement of an object in the current scene of the content played on the display apparatus 2, control the lighting module 10 such that a gradation of colors corresponding to the current scene of the content moves in a direction corresponding to the movement of the object.

The controller 130 may include at least one memory for storing a program for performing the above-described operation and an operation to be described below, and at least one processor for executing the stored program.

In this case, the controller 130 may be provided in the lighting module 10, and according to embodiments, when the lighting module 10 may be provided as a plurality of lighting modules 10, the controller 130 may be provided in each of the plurality of lighting modules 10 and the plurality of lighting modules 10 may share a control command therebetween to operate as a single lighting apparatus 1.

Referring to FIG. 4, the light emitting device 140 according to an embodiment may be provided as a plurality of light emitting devices in the lighting module 10 to form the lighting module 10. In this case, the plurality of light emitting devices 140 are arranged in two dimensions within the lighting module 10 to form an array of light emitting devices 140, and the color and the brightness of each of the plurality of light emitting devices 140 may be individually controlled, and thus various patterns of light emission may be output from the lighting module 10.

In this case, as described above, the light emitting device 140 may be provided as an LED or an OLED. LEDs may be implemented in various sizes, and may include, for example, Mini LEDs and/or Micro LEDs.

The reception confirming light emitting device 150 according to an embodiment may emit light in response to information being transmitted from the display apparatus 2 to the lighting apparatus 1 under the control of the controller 130.

To this end, the reception confirming light emitting device 150 may be provided as a known type of light emitting diode, and may be provided at one side of the body 15 of the lighting module 10. For example, the reception confirming light emitting device 150 may be provided at the corner of the body 15 of the lighting module 10. However, the position of the reception confirming light emitting device 150 is not limited to the above example, and there is no limitation on the position of the reception confirming light emitting device 150 as long as the user may check light emitted from the reception confirming light emitting device 150.

In the above, the configuration of the lighting apparatus 1 has been described. The following description will be made in relation that the lighting apparatus 1 controls the lighting module 10 with a color and a brightness corresponding to a color and a brightness of a scene played on the display apparatus 2.

Figure 6:
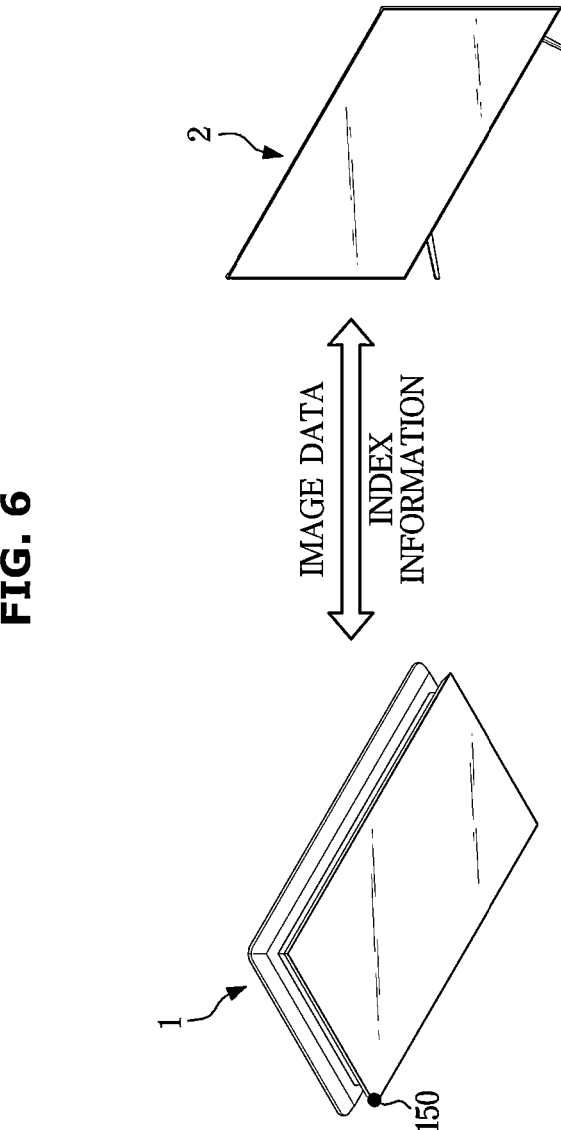
FIG. 6 is a view for describing communication between a lighting apparatus and a display apparatus according to an embodiment.
Figure 7:
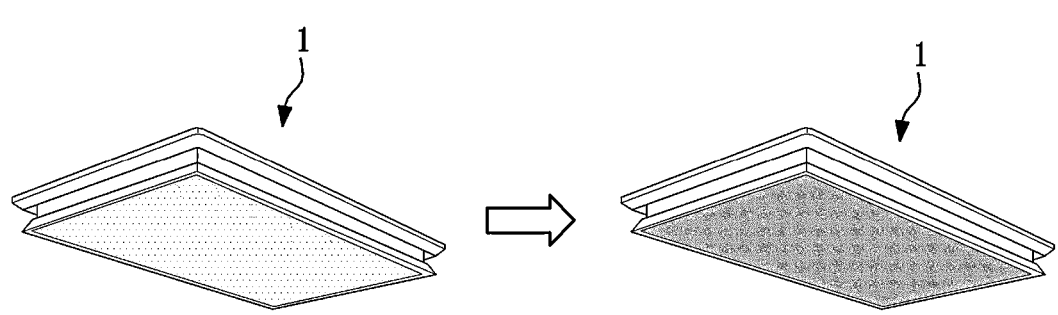
FIG. 7 is a view for describing an example in which a lighting apparatus adjusts a color and a brightness whenever a scene is changed according to an embodiment.
Figure 7:
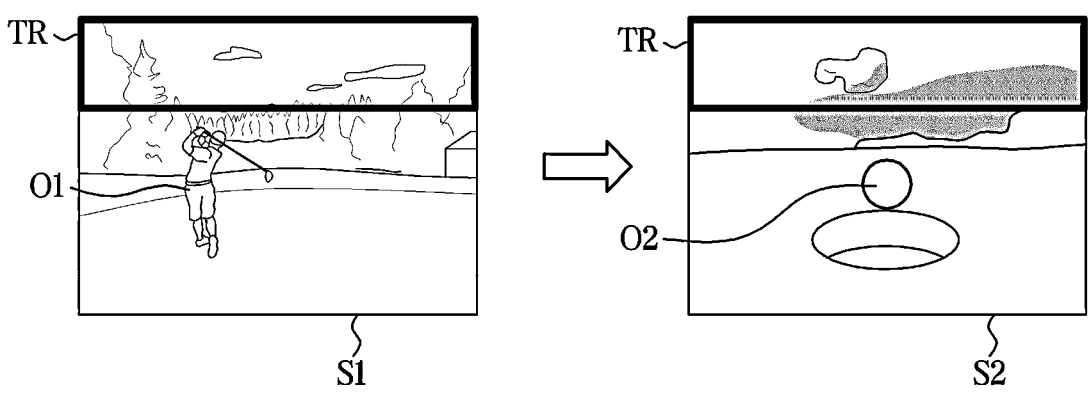
Figure 8:
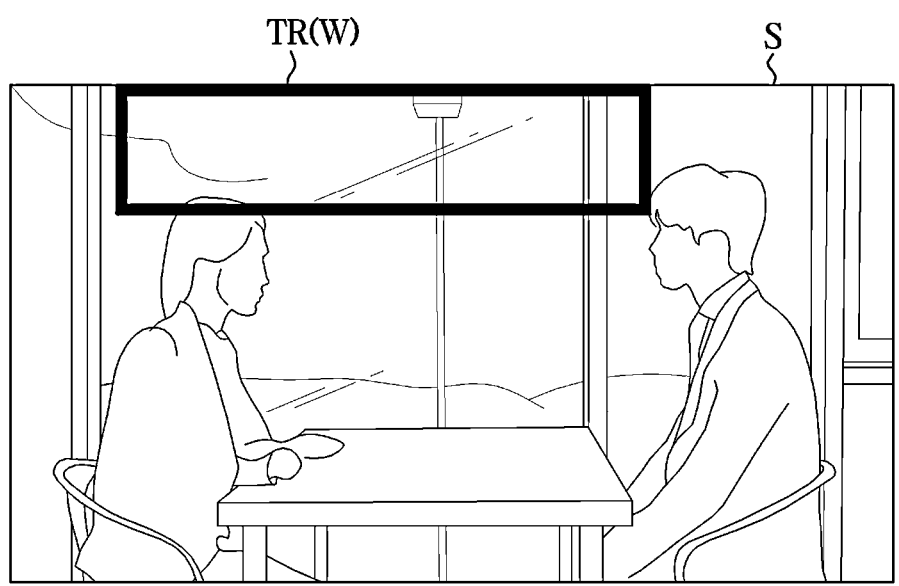
FIG. 8 is a view for describing an example in which a lighting apparatus determines a color and a brightness based on a window region when a scene of content is an indoor scene according to an embodiment.
Figure 9:
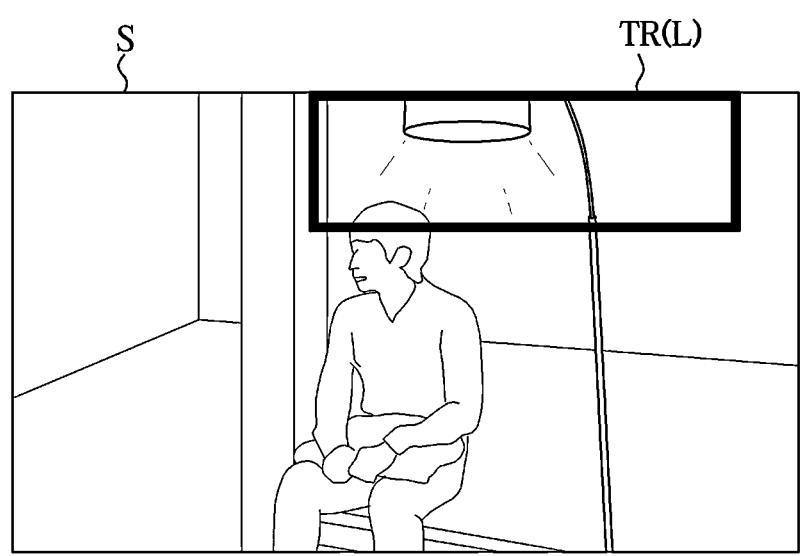
FIG. 9 is a view for describing an example in which a lighting apparatus determines a color and a brightness based on a light source area when a scene of content is an indoor scene according to an embodiment.

FIG. 6 is a view for describing communication between a lighting apparatus (1)2 and a display apparatus (2) according to an embodiment, FIG. 7 is a diagram for describing an example in which a lighting apparatus (1) adjusts a color and a brightness whenever a scene is changed according to an embodiment, FIG. 8 is a diagram for describing an example in which a lighting apparatus (1) determines a color and a brightness based on a window region when a scene of content is an indoor scene according to an embodiment, and FIG. 9 is a diagram for describing an example in which a lighting apparatus determines a color and a brightness based on a light source area when a scene of content is an indoor scene according to an embodiment.

Referring to FIG. 6, the lighting apparatus 1 according to an embodiment may communicate with the display apparatus 2 through the communicator 110.

The lighting apparatus 1 may identify content played on the display apparatus 2 based on communication with the display apparatus 2.

Specifically, the lighting apparatus 1 may identify the content played on the display apparatus 2 by receiving image data from the display apparatus 2 or receiving index information corresponding to an image from the display apparatus 2.

The lighting apparatus 1 according to an embodiment may control the lighting module 10 to emit light with a color and a brightness corresponding to a color and a brightness of a current scene of content.

Specifically, the lighting apparatus 1 may determine the color and the brightness of the current scene of the content based on information received from the display apparatus 2.

The lighting apparatus 1 may, in response to image data of the content being received from the display apparatus 2, determine the color and the brightness of the current scene of the content based on image processing of the image data.

For example, referring to FIG. 7, the lighting apparatus 1 may determine a color and a brightness of upper regions among regions excluding focused objects O1 and O2 within current scenes of the content as the color and the brightness of the current scene.

That is, the lighting apparatus 1 may set upper regions excluding focused objects O1 and O2 in current scenes S1 and S2 of the content played on the display apparatus 2 as target regions TR, determine a color and a brightness of the target regions TR through image processing of the target regions TR, and determine the color and the brightness of the target regions TR as the color and the brightness of the current scenes S1 and S2 of the content played on the display apparatus 2. Accordingly, the lighting apparatus 1 may control the lighting module 10 with a color and a brightness corresponding to the color and the brightness in the region TR including the sky in the current scenes S1 and S2 of the content, and the lighting module 10 provided on the ceiling in the indoor space may emit light with the color and the brightness corresponding to the sky of the content played on the display apparatus 2, and thus the user may feel the atmosphere of the sky on the content even in the indoor space.

As described above, the lighting apparatus 1 may, in response to the current scenes S1 and S2 of the content played on the display apparatus 2 being corresponding to an outdoor space, determine upper regions of objects O1 and O2 (e.g., a region including the sky) as target regions TR for image processing, and allow the lighting module 10 to emit light in a color (e.g., a sky blue, a red, or a black) corresponding to the upper region.

In addition, referring to FIG. 8, the lighting apparatus 1 according to an embodiment may determine a region W, in which a window is located within a current scene S of content played on the display apparatus 2, as a target region TR for image processing, and control the lighting module 10 to emit light with a color and a brightness corresponding to the color and the brightness of the region W in which the window is located.

As described above, the lighting apparatus 1 may, in response to a current scene S of content played on the display apparatus 2 being corresponding to an indoor space, determine the region W including the window as the target region TR for image processing, and allow the lighting module 10 to emit light with a color and a brightness corresponding to the color and the brightness outside of the window.

In addition, referring to FIG. 9, the lighting apparatus 1 according to an embodiment may determine a region L, in which a lighting lamp is located within a current scene S of content played on the display apparatus 2, as a target region TR for image processing, and control the lighting module 10 to emit light with a color and a brightness corresponding to the color and the brightness of the region L in which the lighting lamp is located.

As described above, the lighting apparatus 1 may, in response to a current scene S of content played on the display apparatus 2 being corresponding to an indoor space having no window, determine the region W including the lighting lamp as the target region TR for image processing, and allow the lighting module 10 to emit light with a color and a brightness corresponding to the color and the brightness of the lighting lamp.

In addition, the lighting apparatus 1 according to an embodiment may determine a color and a brightness of a region occupying the largest area within a current scene S of content played on the display apparatus 2 as the color and the brightness of the current scene of the content.

In addition, the lighting apparatus 1 according to an embodiment may, in response to index information on a current scene of content being received from the display apparatus 2, determine the color and the brightness of the current scene of content based on the index information.

The index information may correspond to index information for a corresponding scene, such as information about a time point such as dawn, daytime, or night, or information about a place such as a cafe, the sea, or a mountain.

That is, the lighting apparatus 1 may determine the color and the brightness representing the current scene based on information about the current scene indicated by the index information.

In addition, although not shown, the lighting apparatus 1 according to an embodiment may determine the color and the brightness of the current scene of the content based on image processing of a screen of the display apparatus 2 photographed through the camera 120.

In this case, the color of the content played by the display apparatus 2 and the color of the light emitted from the lighting module 10 may be colors of the same color family, and the color of the content and the color of light emitted from the lighting module 10 corresponding thereto may be stored in advance to match each other.

In addition, the brightness of the content played by the display apparatus 2 may be proportional to the brightness of light emitted from the lighting module 10, and the brightness of the content and the brightness of light emitted from the lighting module 10 corresponding thereto may be stored in advance to match each other.

In this case, as shown in FIG. 7, the lighting apparatus 1 may update the color and the brightness of light to be emitted by the lighting module 10 whenever the content scene is changed.

Specifically, the lighting apparatus 1 may control the lighting module 10 to emit light with a color and a brightness corresponding to a color and a brightness (e.g., color: sky blue/brightness: high) of a first scene S1 of the content played on the display apparatus 2.

The lighting apparatus 1 may, in response to the content played on the display apparatus 2 being switched from the first scene S1 to a second scene S2, control the lighting module 10 to emit light with a color and a brightness (e.g., color: red/brightness: medium) corresponding to a color and a brightness of the second scene S2.

In this case, according to embodiments, the lighting apparatus 1 may, upon identifying a background color, a tone change, a scene change effect, a character change, a background music change, a motion change, and the like as a result of image processing on the content played in the display apparatus 2, determine that the scene has been switched.

In addition, according to embodiments, the lighting apparatus 1 may, upon profile information generated based on a background color, a tone change, a scene change effect, a character change, a background music change, a motion change, and the like being received from the display apparatus 2, determine that the scene has been switched.

Figure 10:
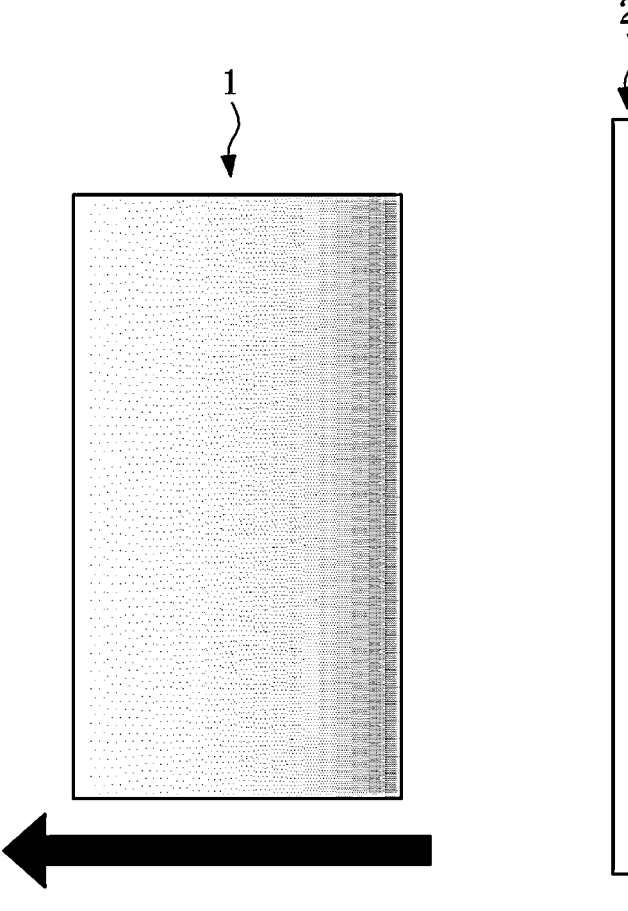
FIG. 10 is a view for describing a case in which a lighting apparatus controls a lighting module in consideration of a position of a display apparatus according to an embodiment.
Figure 11:
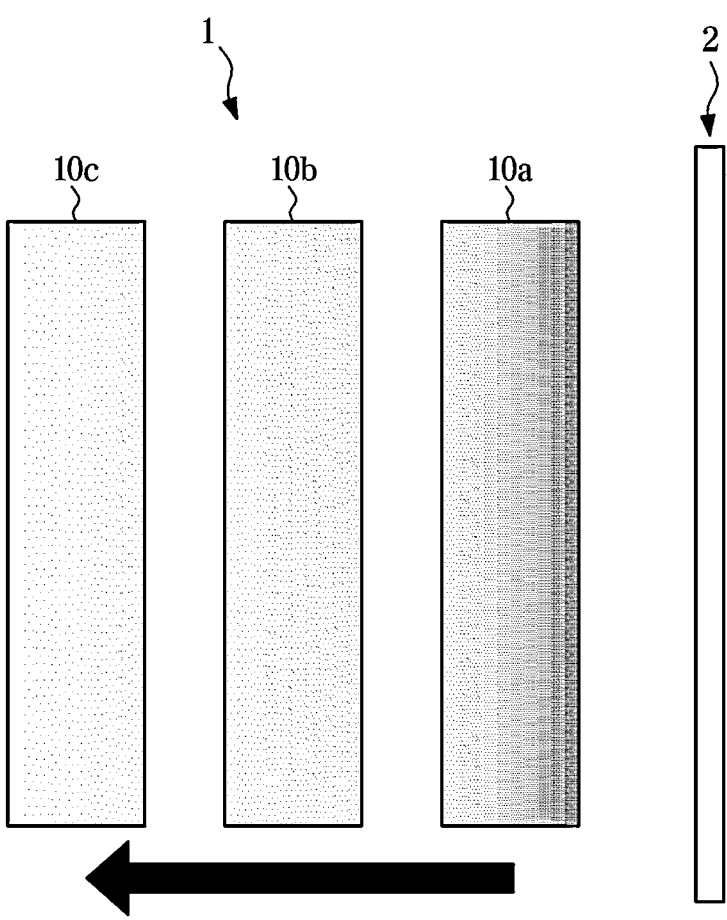
FIG. 11 is a view for describing a case in which a lighting apparatus controls a plurality of lighting modules in consideration of a position of a display apparatus according to an embodiment.

FIG. 10 is a diagram for describing a case in which a lighting apparatus (1) controls a lighting module in consideration of a position of a display apparatus (2) according to an embodiment, and FIG. 11 is a diagram for describing a case in which a lighting apparatus (1) controls a plurality of lighting modules (10) in consideration of a position of a display apparatus (2) according to an embodiment.

Referring to FIG. 10, the lighting apparatus 1 according to an embodiment may control the lighting module 10 to emit light with a gradation of a color based on a direction in which the display apparatus 2 is located.

Specifically, the lighting apparatus 1 may determine a color corresponding to a color of a scene of content played on the display apparatus 2, and control each of the light emitting devices 140 in the 2D-array of the light emitting devices 140 to emit light of a color having a higher brightness as being nearing to a side in which the display apparatus 2 is located.

Referring to FIG. 11, the lighting apparatus 1 according to an embodiment may, in response to the lighting module 10 being provided as a plurality of lighting modules 10a, 10b, and 10c, control each of the plurality of lighting modules 10a, 10b, and 10c to emit light of a color having a lower brightness as being distant from a side in which the display apparatus 2 is located.

Specifically, the lighting apparatus 1 may determines a color corresponding to a color of a scene of content played on the display apparatus 2, and control each of the plurality of lighting modules 10a, 10b, and 10c to emit light with a color of lower brightness as being distant from a side in which the display apparatus 2 is located increases.

Figure 12:
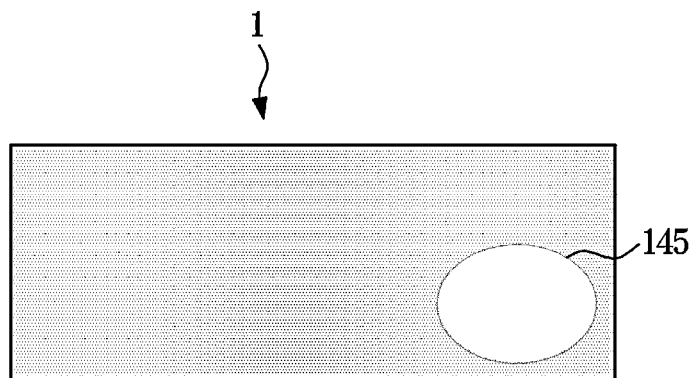
FIG. 12 is a view for describing a case in which a lighting apparatus controls a lighting module to emit white light in a direction corresponding to a light source of a scene of content, according to an embodiment.
Figure 12:
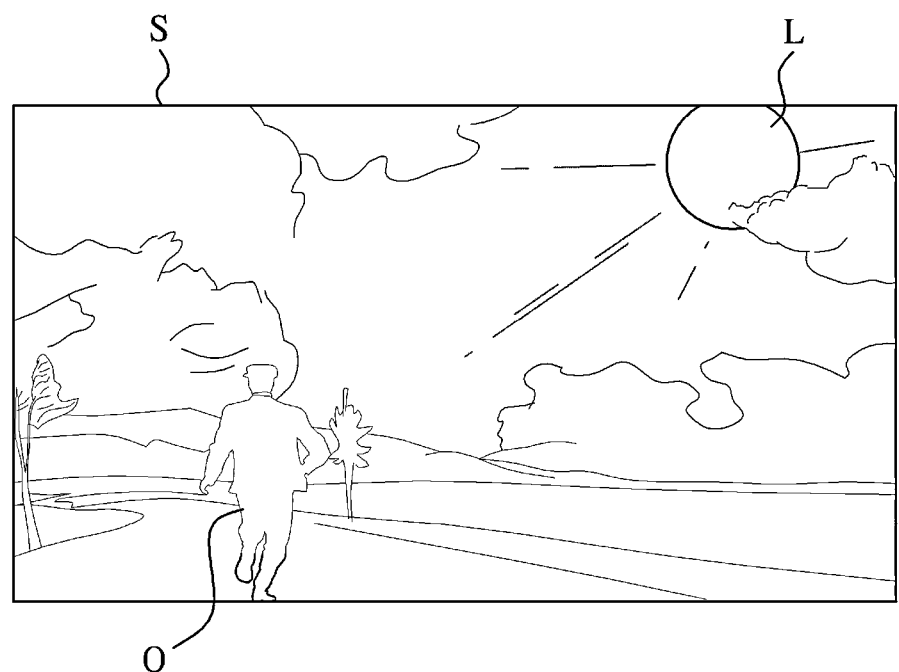

FIG. 12 is a diagram for describing a case in which a lighting apparatus (1) controls a lighting module to emit white light in a direction corresponding to a light source of a scene of content, according to an embodiment.

Referring to FIG. 12, the lighting apparatus 1 according to an embodiment may, in response to a light source L (e.g., the sun or a lighting lamp) being identified in the current scene of the content played on the display apparatus 2, control the lighting module 10 such that at least one light emitting device 145, among the plurality of light emitting devices 140 in the lighting module 10, located in a direction corresponding to the light source L emits white light.

For example, the lighting apparatus 1 may, in response to a light source L (e.g., the sun) in the current scene S of the content played on the display apparatus 2 being located on the right side as shown in FIG. 12, control at least one light emitting device 145 located on the right side, among the plurality of light emitting devices 140 in the lighting module 10, to emit white light.

In this case, the lighting apparatus 1 may identify a light source L self-emitting in the scene S based image processing of image data received from the display apparatus 2, or may identify the direction and brightness of a shadow cast on an object in the scene S to identify the position and size of the light source L.

In this case, the lighting apparatus 1 may, in response to a plurality of objects O being present on the scene S of the content played on the display apparatus 2, use the closest object from the light source L, the largest object on the scene S, or a focused object as a reference for estimating the direction and the brightness of the shadow.

Figure 13:
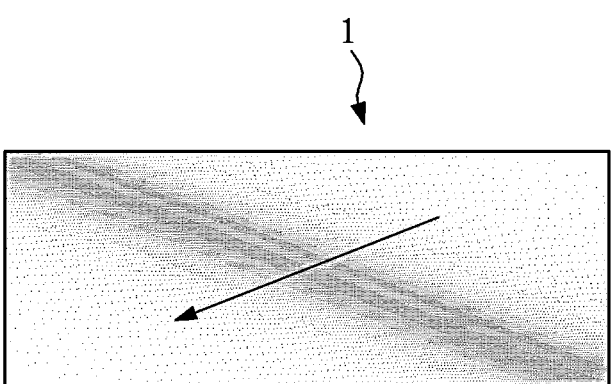
FIG. 13 is a view for describing a case in which a lighting apparatus moves a gradation in a direction corresponding to a movement of an object in a scene of content according to an embodiment.
Figure 13:
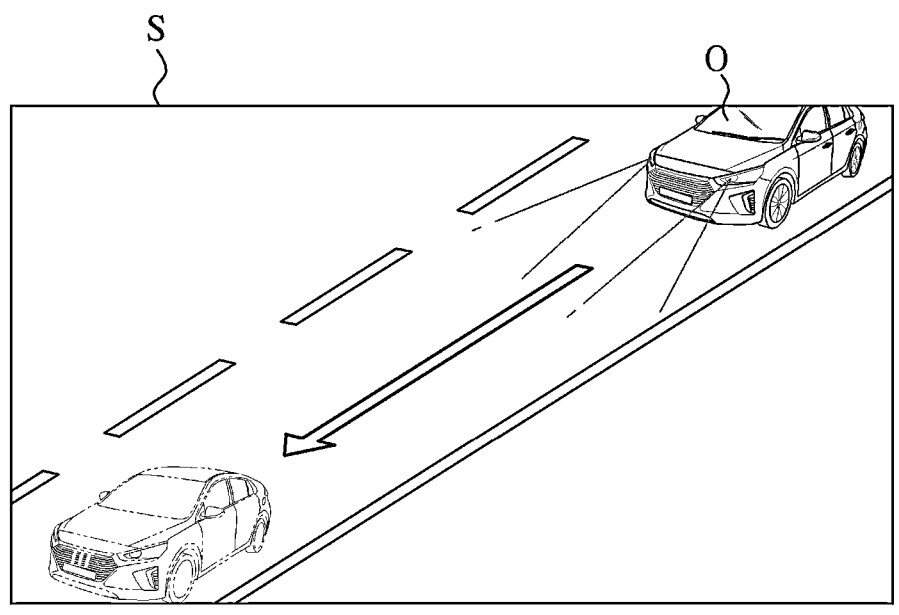

FIG. 13 is a diagram for describing a case in which a lighting apparatus (1) moves a gradation in a direction corresponding to a movement of an object of a scene of content according to an embodiment.

Referring to FIG. 13, the lighting apparatus 1 according to an embodiment may, in response to movement of an object O in the current scene S of the content played on the display apparatus 2, control the lighting module 10 such that a gradation of a color corresponding to the current scene S of the content moves in a direction corresponding to the movement of the object O.

For example, the lighting apparatus 1 may, in response to an object O in a current scene S of content played on the display apparatus 2 being moved from right to left as shown in FIG. 13, control the lighting module 10 such that the gradation of a color corresponding to the current scene S moves from right to left.

Hereinafter, an embodiment of a method of controlling the lighting apparatus (1) according to an aspect will be described. The lighting apparatus (1) according to the above-described embodiment may be used in the method of controlling the lighting apparatus (1). Accordingly, the contents described above with reference to FIGS. 1 to 13 may be equally applied to the method of controlling the lighting apparatus (1).

Figure 14:
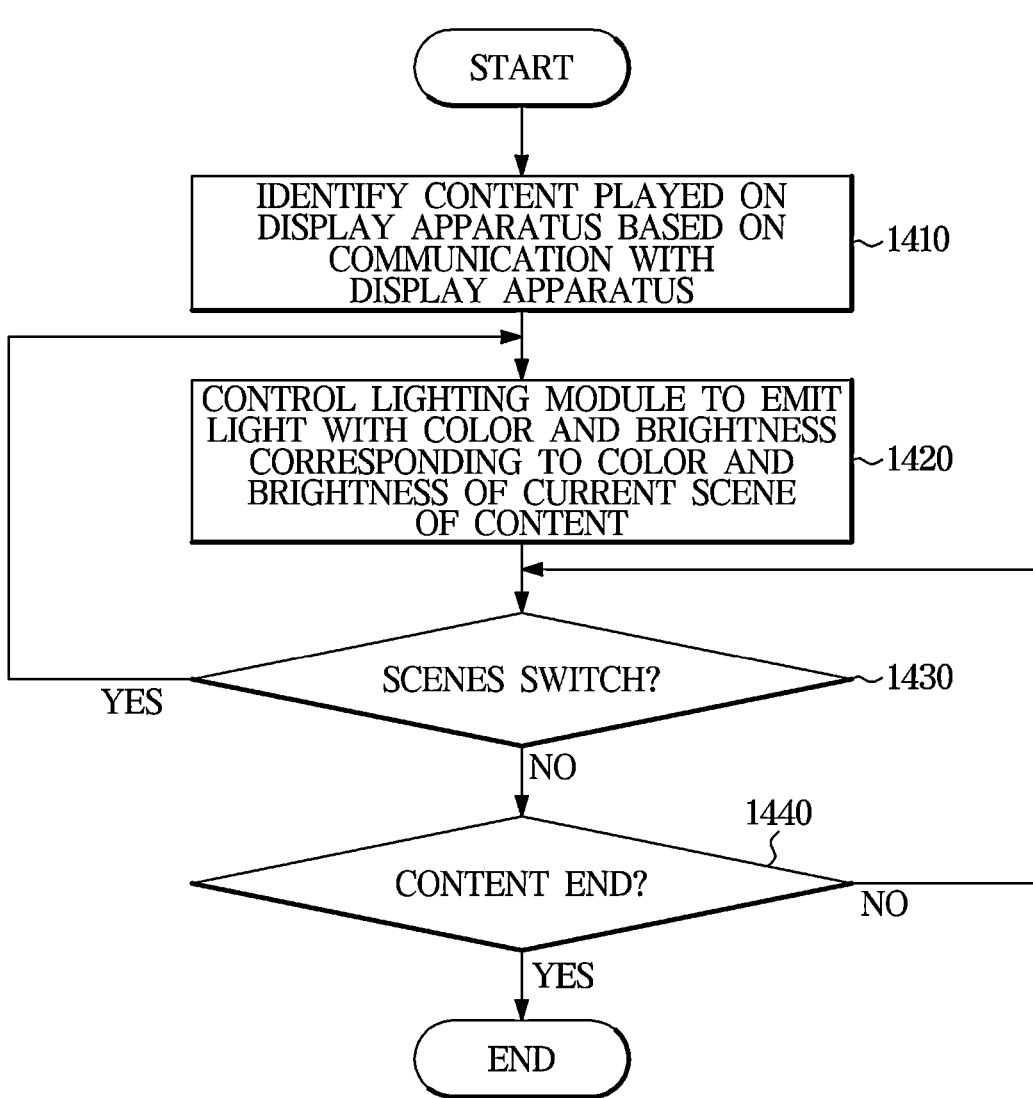
FIG. 14 is a flowchart showing a case of controlling a lighting module with a color and a brightness corresponding to a color and a brightness of content played on a display apparatus in a method of controlling a lighting apparatus according to an embodiment.

FIG. 14 is a flowchart showing a case of controlling a lighting module with a color and brightness corresponding to a color and brightness of content played on a display apparatus (2) in a method of controlling a lighting apparatus (1) according to an embodiment.

Referring to FIG. 14, the lighting apparatus 1 according to an embodiment may identify content played on the display apparatus 2 based on communication with the display apparatus 2 (1410).

Specifically, the lighting apparatus 1 may identify content played on the display apparatus 2 by receiving image data from the display apparatus 2 or receiving index information corresponding to an image from the display apparatus 2.

In addition, the lighting apparatus 1 may identify content played on the display apparatus 2 based on image data of the display apparatus 2 photographed by the camera 120.

The lighting apparatus 1 according to an embodiment may control the lighting module 10 to emit light with a color and a brightness corresponding to a color and a brightness of a current scene of content (1420).

Specifically, the lighting apparatus 1 may determine the color and the brightness of the current scene of content based on information received from the display apparatus 2. In this case, according to embodiments, the lighting apparatus 1 may, in response to the information being received from the display apparatus 2, control the reception confirming light emitting device 150 provided on the body 15 of the lighting module 10 to emit light such that the user may confirm the reception of the information.

The lighting apparatus 1, according to embodiments, may, in response to image data of content being received from the display apparatus 2, determine the color and the brightness of the current scene of the content based on image processing of the image data.

For example, the lighting apparatus 1 may determine a color and a brightness of an upper region, among regions of the current scene of the content, excluding a focused object as the color and the brightness of the current scene of the content.

In addition, the lighting apparatus 1 may determine a color and a brightness of a region occupying the largest area within the current scene of the content as the color and the brightness of the current scene of the content.

The lighting apparatus 1, according to embodiments, may, in response to index information on the current scene of content being received from the display apparatus 2, determine the color and the brightness of the current scene of the content based on the index information.

The index information may correspond to index information for a corresponding scene, such as information about a time point such as dawn, daytime, or night, or information about a place such as a cafe, the sea, or a mountain.

The lighting apparatus 1, according to embodiments, may determine the color and the brightness of the current scene of the content based on image processing of a screen of the display apparatus 2 photographed through the camera 120.

In this case, the color of the content played by the display apparatus 2 and the color of the light emitted from the lighting module 10 may be colors of the same color family, and the color of the content and the color of light emitted from the lighting module 10 corresponding thereto may be stored in advance to match each other.

In addition, the brightness of the content played by the display apparatus 2 may be proportional to the brightness of light emitted from the lighting module 10, and the brightness of the content and the brightness of light emitted from the lighting module 10 corresponding thereto may be stored in advance to match each other.

The lighting apparatus 1 according to an embodiment may, in response to scene switching (YES in operation 1430), re-perform operation 1420 to update the color and the brightness of light of the lighting module 10.

The lighting apparatus 1 according to the embodiment may, in response to absence of scene switching (NO in operation 1430), repeatedly perform the operation 1420 until the content ends (YES in operation 1440).

Figure 15:
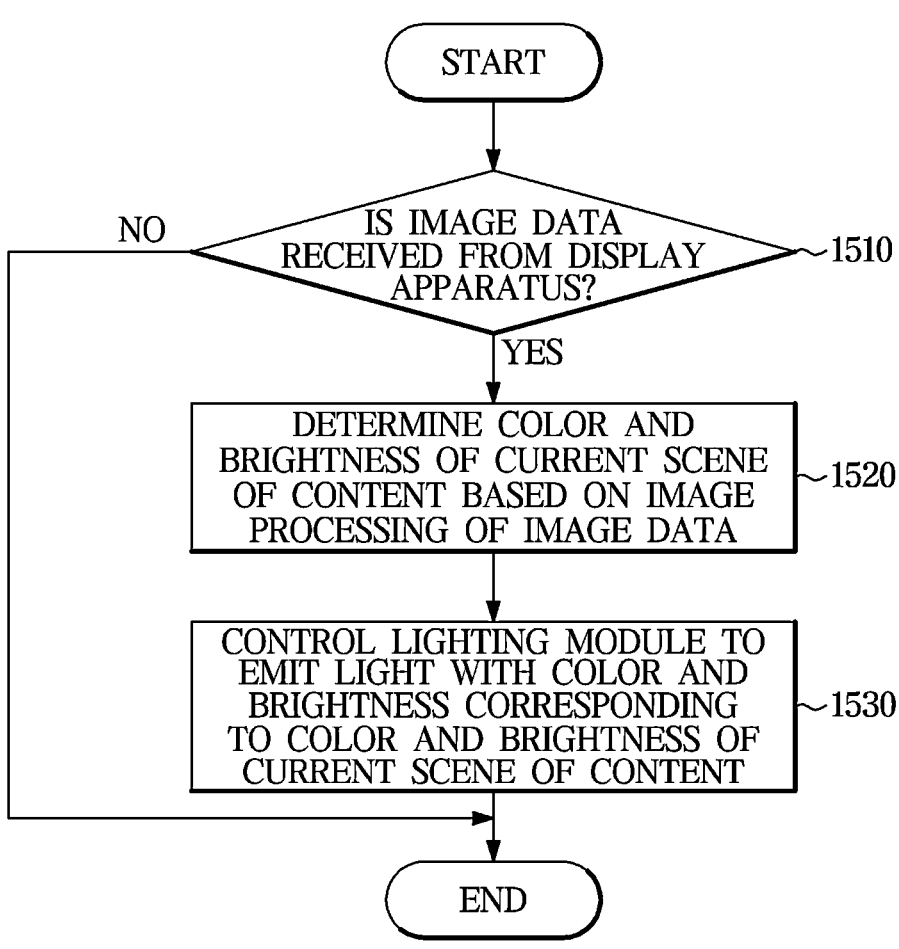
FIG. 15 is a flowchart showing a case of controlling a lighting module based on image processing of content played on a display apparatus in a method of controlling a lighting apparatus according to an embodiment.

FIG. 15 is a flowchart showing a case of controlling a lighting module based on image processing of content played on a display apparatus (2) in a method of controlling a lighting apparatus (1) according to an embodiment.

Referring to FIG. 15, the lighting apparatus 1 according to an embodiment may, in response to image data of content being received from the display apparatus 2 (YES in operation 1510), determine the color and the brightness of the current scene of the content based on image processing of the image data (1520).

For example, the lighting apparatus 1 may determine a color and a brightness of an upper region, among regions the current scene of the content, excluding a focused object as the color and the brightness of the current scene of the content.

In addition, the lighting apparatus 1 according to the embodiment may determine a region W, in which a window is located within a current scene S of content played on the display apparatus 2, as a target region TR for image processing, and control the lighting module 10 to emit light with a color and a brightness corresponding to the color and the brightness of the region W in which the window is located.

In addition, the lighting apparatus 1 according to an embodiment may determine a region L, in which a lighting lamp is located within a current scene S of content played on the display apparatus 2, as a target region TR for image processing, and control the lighting module 10 to emit light with a color and a brightness corresponding to the color and the brightness of the region L in which in which the lighting lamp is located.

In addition, the lighting apparatus 1 according to an embodiment may determine a color and a brightness of a region occupying the largest area within the current scene S of the content as the color and the brightness of the current scene of the content.

The lighting apparatus 1 according to the embodiment may control the lighting module 10 to emit light with a color and a brightness corresponding to the color and the brightness of the current scene of the content (1530).

Figure 16:
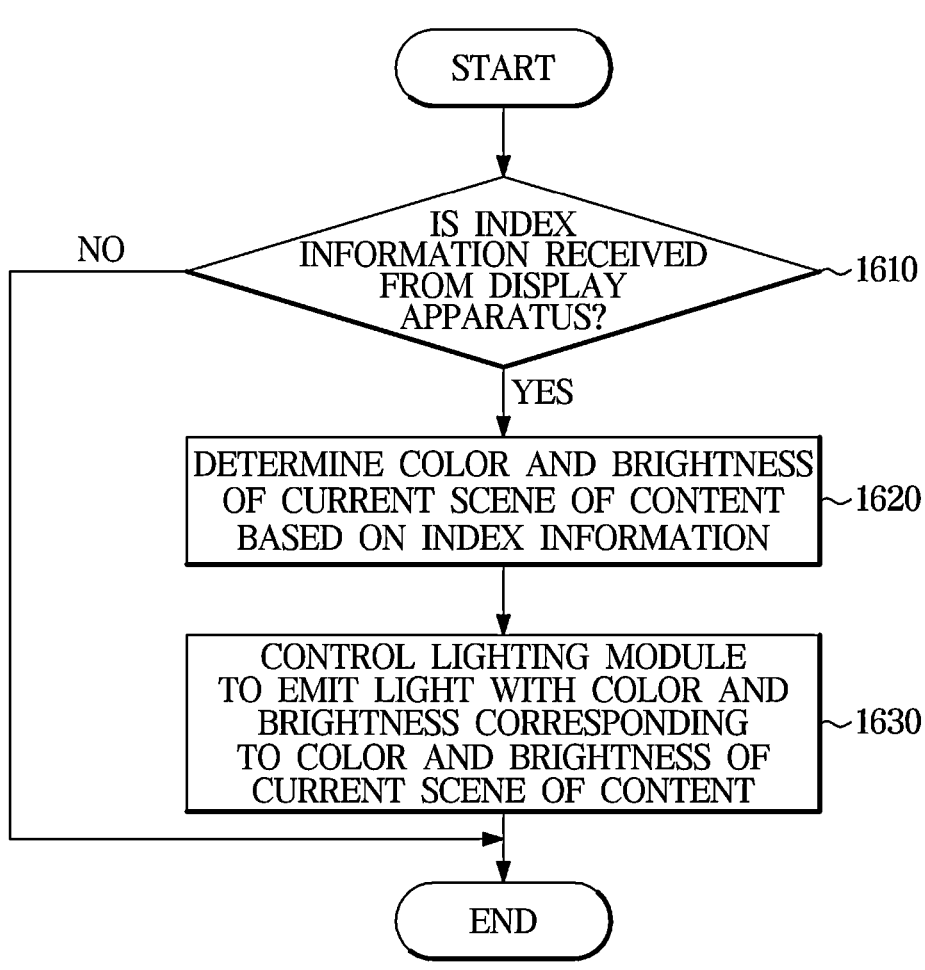
FIG. 16 is a flowchart showing a case of controlling a lighting module based on index information of content played on a display apparatus in a method of controlling a lighting apparatus according to an embodiment.

FIG. 16 is a flowchart showing a case of controlling a lighting module based on index information of content played on a display apparatus (2) in a method of controlling a lighting apparatus (1) according to an embodiment.

Referring to FIG. 16, the lighting apparatus 1 according to an embodiment may, in response to index information being received from the display apparatus 2 (YES in operation S1610), determine the color and the brightness of the current scene of content based on the index information (1620).

The index information may correspond to index information for a corresponding scene, such as information about a time point such as dawn, daytime, or night, or information about a place such as a cafe, the sea, or a mountain.

That is, the lighting apparatus 1 may determine the color and the brightness representing the current scene based on information about the current scene indicated by the index information.

The lighting apparatus 1 according to the embodiment may control the lighting module 10 to emit light with a color and a brightness corresponding to the color and the brightness of the current scene of the content (1630).

Figure 17:
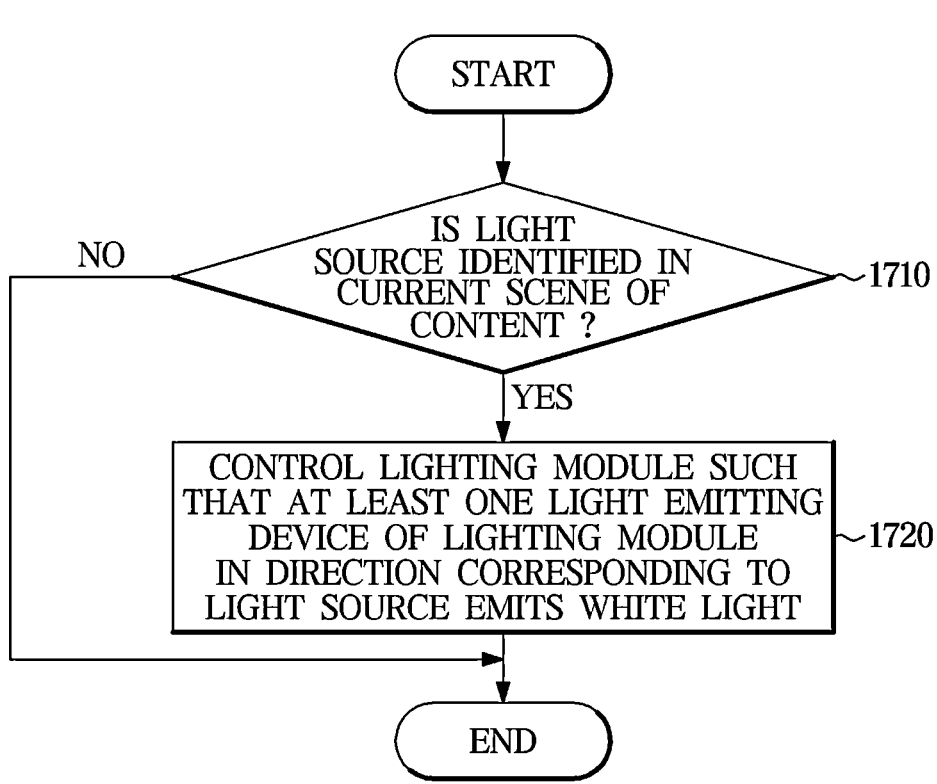
FIG. 17 is a flowchart showing a case of controlling a lighting module based on a light source in a scene of content played on a display apparatus in a method of controlling a lighting apparatus according to an embodiment.

FIG. 17 is a flowchart showing a case of controlling a lighting module based on a light source in a scene of content played on a display apparatus (2) in a method of controlling a lighting apparatus (1) according to an embodiment.

Referring to FIG. 17, the lighting apparatus 1 according to an embodiment may, in response to a light source being identified in the current scene of the content (YES in operation 1710), control the lighting module 10 such that at least one light emitting device 145 in the lighting module 10 in a direction corresponding to the light source L emits white light (1720).

For example, the lighting apparatus 1 may, in response to a light source L (e.g., the sun) in the current scene S of the content being played on the display apparatus 2 being located on the right side, control at least one light emitting device 145 located on the right side, among the plurality of light emitting devices 140 in the lighting module 10, to emit white light.

In this case, the lighting apparatus 1 may identify a light source L self-emitting in the scene S based image processing of image data received from the display apparatus 2, or identify the direction and brightness of a shadow cast on an object O in the scene S, to identify the position and size of the light source L.

In this case, the lighting apparatus 1 may, in response to a plurality of objects O being located on the scene S of the content played on the display apparatus 2, use the closest object from the light source L, the largest object on the scene S, or a focused object as a reference for estimating the direction and the brightness of the shadow.

Figure 18:
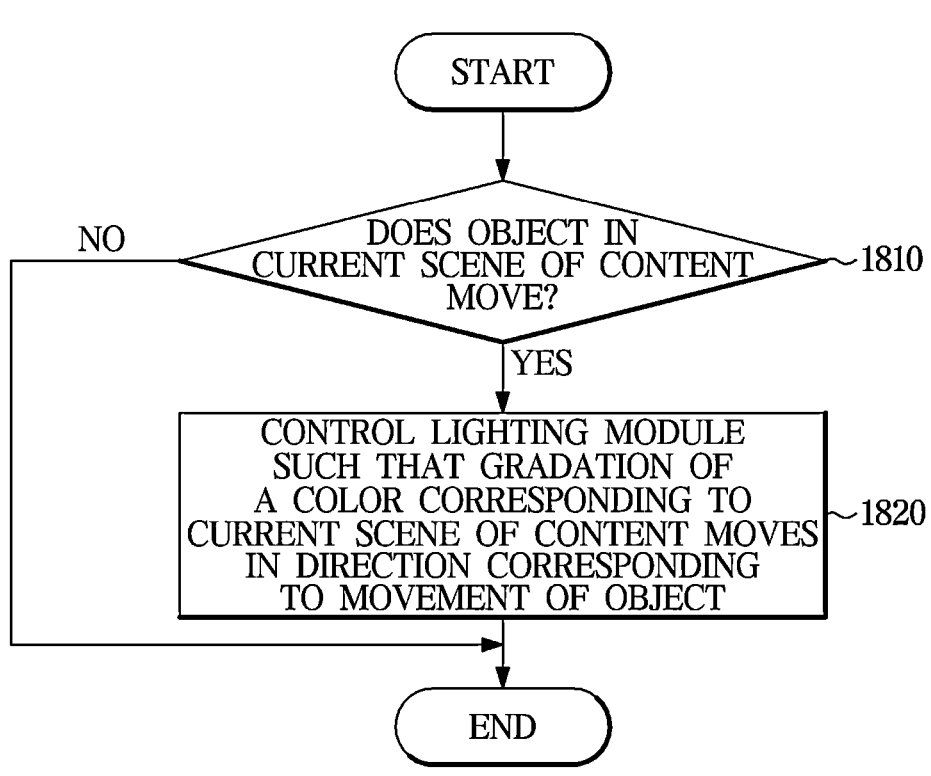
FIG. 18 is a flowchart showing a case of controlling a lighting module based on a movement of an object in a scene of content played on a display apparatus in a method of controlling a lighting apparatus according to an embodiment.

FIG. 18 is a flowchart showing a case of controlling a lighting module based on a movement of an object in a scene of content played on a display apparatus (2) in a method of controlling a lighting apparatus (1) according to an embodiment.

Referring to FIG. 18, the lighting apparatus 1 according to an embodiment may, in response to movement of an object O in the current scene S of the content (YES in operation 1810), control the lighting module 10 such that a gradation of a color corresponding to the current scene S of the content moves in a direction corresponding to the movement of the object O (1820).

For example, the lighting apparatus 1 may, in response to an object O in a current scene S of content played on the display apparatus 2 being moved from right to left, control the lighting module 10 such that the gradation of a color corresponding to the current scene S moves from right to left.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, a lighting apparatus according to an embodiment and a method of controlling the same are implemented to emit light with a color and a brightness corresponding to a scene of content played on a display apparatus based on information received from the display apparatus located in the same indoor space, so that the atmosphere of the played content can be conveyed to the user.

Although embodiments of the disclosure have been described for illustrative purposes, those skilled in the art will appreciate that various modifications, additions and substitutions are possible, without departing from the scope and spirit of the disclosure. Therefore, embodiments of the disclosure have not been described for limiting purposes.

What is claimed is:

1. A lighting apparatus comprising:
a lighting module configured to emit light; and
at least one processor configured to:
  determine, as a color and a brightness of a current scene of content displayed on a display apparatus, a color and a brightness of an upper region among regions excluding a focused object in the current scene of the content, and
  control the lighting module to emit, in a space in which the display apparatus is located, light with a color and brightness corresponding to the determined color and brightness of the current scene of the content.

2. The lighting apparatus of claim 1, further comprising:
a communicator configured to communicate with the display apparatus, wherein
the at least one processor is configured to determine the color and the brightness of the current scene of the content based on information received from the display apparatus through the communicator.

3. The lighting apparatus of claim 1, further comprising:
a communicator configured to communicate with the display apparatus,
wherein the at least one processor is configured to:
  in response to image data of the content received from the display apparatus through the communicator, determine the color and the brightness of the current scene of the content based on image processing of the received image data.

4. A lighting apparatus comprising:
a lighting module configured to emit light; and
at least one processor configured to:
  determine, as a color and a brightness of a current scene of content displayed on a display apparatus, a color and a brightness of a region occupying a largest area in the current scene of the content, and
  control the lighting module to emit, in a space in which the display apparatus is located, light with a color and brightness corresponding to the determined color and brightness of the current scene of the content.

5. A lighting apparatus, comprising:
a lighting module configured to emit light; and
at least one processor configured to:
  determine a color and a brightness of a current scene of content displayed on a display apparatus, and
  control the lighting module to emit, in a space in which the display apparatus is located, light with a color and brightness corresponding to the determined color and brightness of the current scene of the content wherein the lighting module incudes a plurality of light emitting devices arranged in two dimensions, and the at least one processor is configured to identify a light source in the current scene of the content, and, in response to the light source being identified in the current scene of the content, control the lighting module so that at least one light emitting devices of the plurality of light emitting devices in a direction corresponding to the light source within the lighting module emits white light.

6. The lighting apparatus of claim 1, further comprising:

a communicator configured to communicate with the display apparatus, wherein the at least one processor is configured to, in response to index information of the current scene of the content received from the display apparatus through the communicator, determine the color and the brightness of the current scene of the content based on the received index information of the current scene of the content.

7. A lighting apparatus comprising:

a lighting module configured to emit light;

a camera; and at least one processor is configured to:

determine a color and a brightness of a current scene of content displayed on a display apparatus through image processing of a screen of the display apparatus photographed by the camera, and control the lighting module to emit, in a space in which the display apparatus is located, light with a color and brightness corresponding to the determined color and brightness of the current scene of the content.

8. The lighting apparatus of claim 1, wherein the at least one processor is configured to:

update the color and the brightness of light emitted by the lighting module based on a scene of the content being switched.

18

9. A lighting apparatus comprising:

a lighting module configured to emit light; and at least one processor configured to:

determine a color and a brightness of a current scene of content displayed on a display apparatus, control the lighting module to emit, in a space in which the display apparatus is located, light with a color and brightness corresponding to the determined color and brightness of the current scene of the content, and, in response to an object moving in the current scene of the content, control the lighting module such that a gradation of a color corresponding to the current scene of the content moves in a direction corresponding to movement of the object.

10. A lighting apparatus comprising:

a lighting module configured to emit light; and at least one processor configured to:

determine a color and a brightness of a current scene of content displayed on a display apparatus, control the lighting module to emit, in a space in which the display apparatus is located, light with a color and brightness corresponding to the determined color and brightness of the current scene of the content, and control the lighting module to emit light with a gradation of a color based on a direction in which the display apparatus is located.

11. A lighting apparatus comprising:

a plurality of lighting modules, and at least one processor configured to:

determine a color and a brightness of a current scene of content displayed on a display apparatus, control the plurality of lighting modules to emit, in a space in which the display apparatus is located, light with a color and brightness corresponding to the determined color and brightness of the current scene of the content, and so that brightness of a respective lighting module is lower as distance of the respective lighting module from the display apparatus increases.

\* \* \* \* \*